United States Patent
Kawabata

(10) Patent No.: US 10,158,320 B2
(45) Date of Patent: Dec. 18, 2018

(54) SHIFT RANGE SWITCHOVER CONTROL DEVICE

(71) Applicant: DENSO CORPORATION, Kariya, Aichi-pref. (JP)

(72) Inventor: Tsuyoshi Kawabata, Kariya (JP)

(73) Assignee: DENSO CORPORATION, Kariya (JP)

( * ) Notice: Subject to any disclaimer, the term of this patent is extended or adjusted under 35 U.S.C. 154(b) by 330 days.

(21) Appl. No.: 15/237,977

(22) Filed: Aug. 16, 2016

(65) Prior Publication Data

US 2017/0082192 A1    Mar. 23, 2017

(30) Foreign Application Priority Data

Sep. 18, 2015 (JP) ................. 2015-185057

(51) Int. Cl.
*H02P 29/60* (2016.01)
*F16H 61/32* (2006.01)

(52) U.S. Cl.
CPC ............ *H02P 29/60* (2016.02); *F16H 61/32* (2013.01); *F16H 2061/326* (2013.01); *Y02T 10/642* (2013.01)

(58) Field of Classification Search
CPC .. F16H 2061/326; F16H 61/32; Y02T 10/642; Y02T 10/645; Y02T 10/644; B60L 15/20; B60L 15/2054; B60L 2240/425; H02P 29/60
See application file for complete search history.

(56) References Cited

U.S. PATENT DOCUMENTS

| 8,421,396 B2 * | 4/2013 | Yamada | G05B 7/02 318/254.1 |
| 8,762,116 B2 * | 6/2014 | Yeh | F02D 41/065 703/8 |
| 9,050,904 B2 * | 6/2015 | Suzuki | B60L 15/20 |
| 2011/0175563 A1 | 7/2011 | Yamada et al. | |
| 2013/0144478 A1 | 6/2013 | Suzuki et al. | |

FOREIGN PATENT DOCUMENTS

JP    2011-109814    6/2011

* cited by examiner

*Primary Examiner* — Erin D Bishop
(74) *Attorney, Agent, or Firm* — Nixon & Vanderhye P.C.

(57) ABSTRACT

A shift range switchover control ECU controls a motor of an actuator provided to switch over a shift range of a vehicle and includes a temperature estimation part and a driving control part. The temperature estimation part estimates a temperature of the motor 11 based on a driving state of the motor. The driving control part controls driving of the motor and limits the driving of the motor when an estimated temperature exceeds a protection temperature. The temperature estimation part calculates, based on a final temperature indicating the estimated temperature of a system stop time, a restart-time temperature, which is the estimated temperature at time of turning on a starting switch of the vehicle again after turning off the starting switch, and a delay period, during which the temperature estimation part continues to calculate the estimated temperature after turning off of the starting switch. It is thus possible to properly estimate the temperature of the motor.

7 Claims, 12 Drawing Sheets

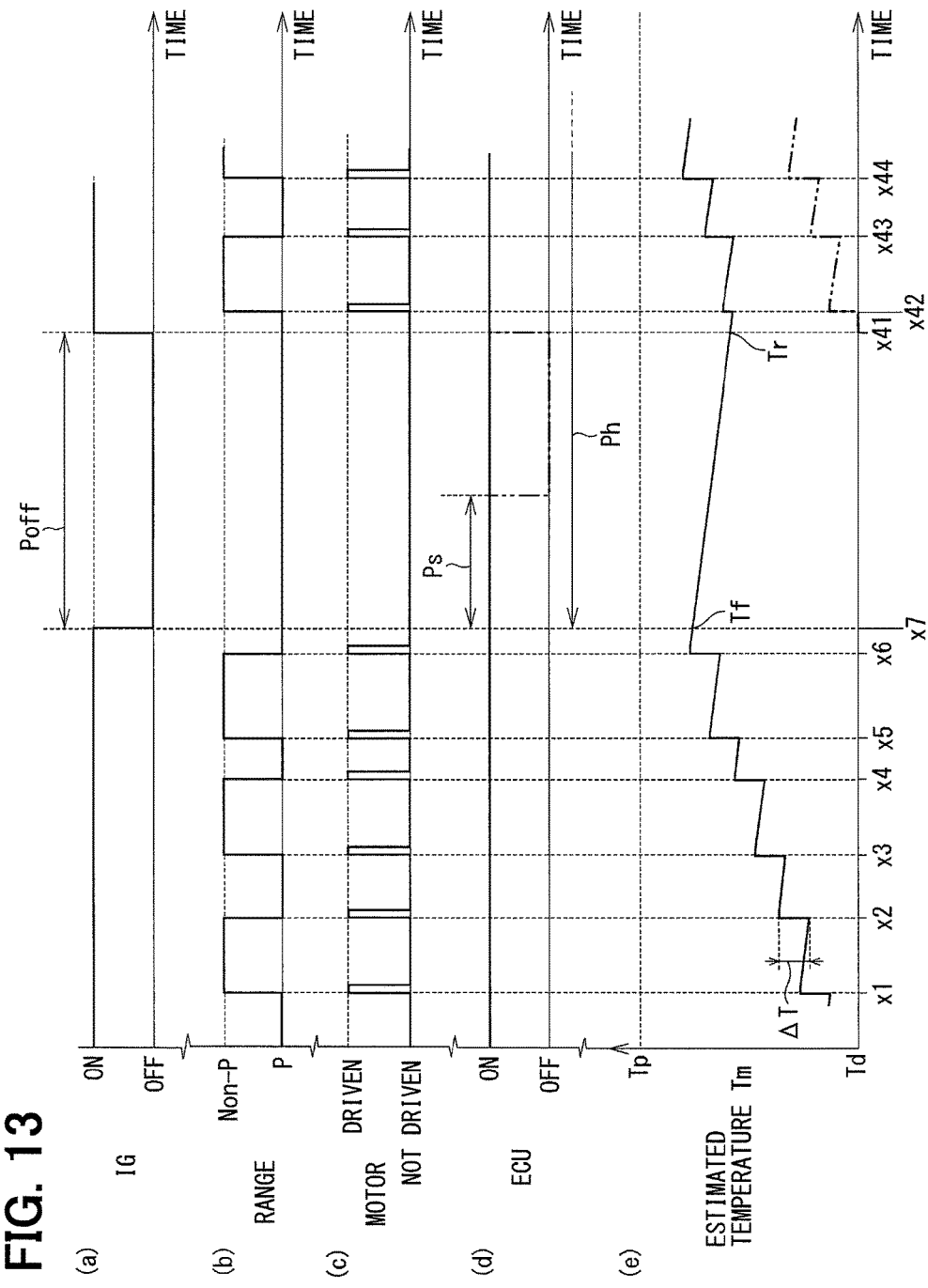

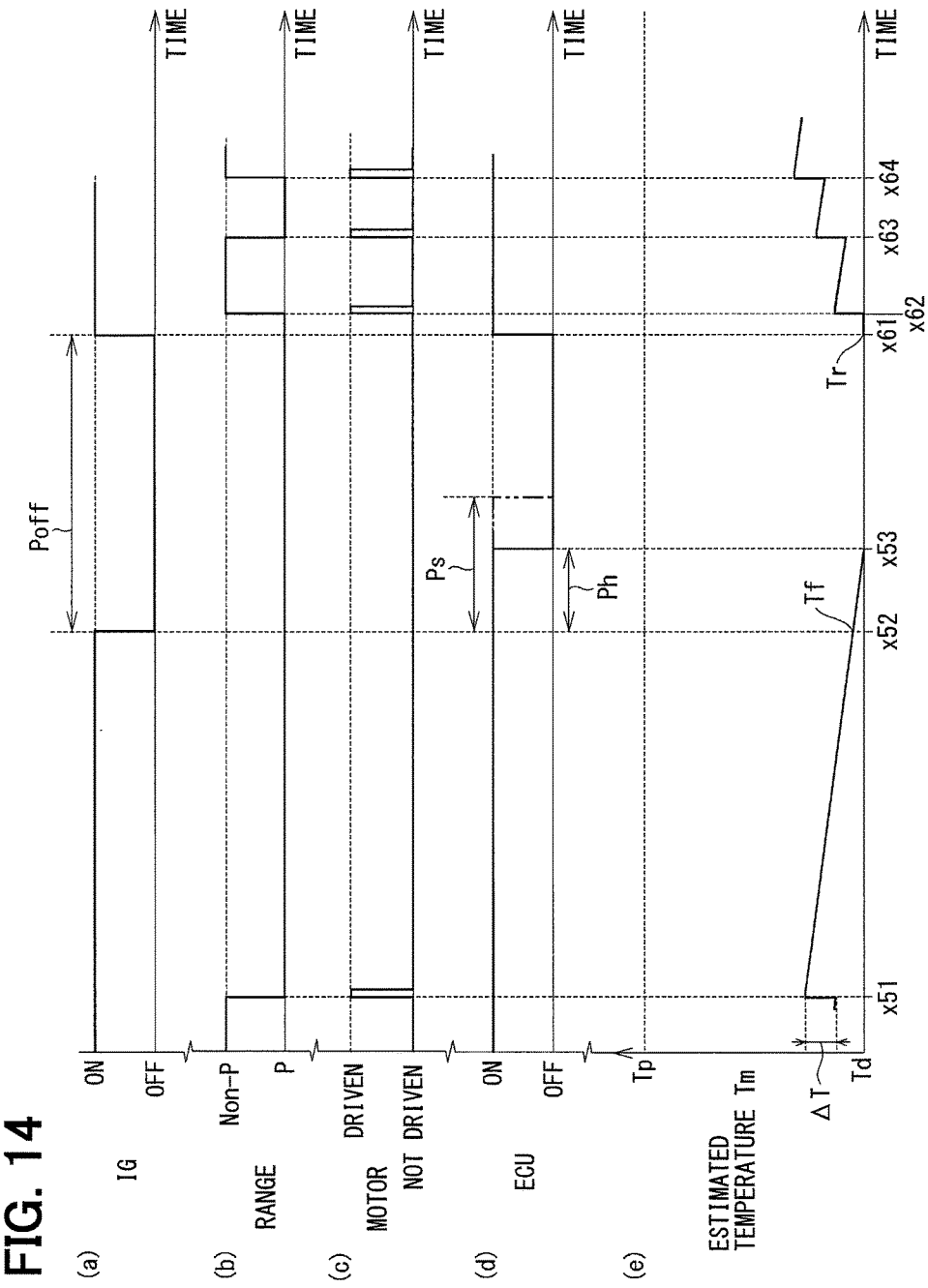

SHIFT RANGE SWITCHOVER CONTROL DEVICE

CROSS REFERENCE TO RELATED APPLICATION

The present application is based on Japanese patent application No. 2015-185057 filed on Sep. 18, 2015, the whole contents of which are incorporated herein by reference.

FIELD

The present disclosure relates to a shift range switchover control device for a vehicle.

BACKGROUND

A conventional shift range switchover control device for a transmission of a vehicle switches over a shift range by controlling a motor in correspondence to a shift range switchover request from a driver. In the shift range switchover device, an electronic control unit (ECU) controls the motor. When the motor is supplied with a current, the ECU and the motor both generate heat because of respective operations. When the driver makes shift range switchover requests repetitively, temperatures of the ECU and the motor rise in a relatively short time period. It is therefore necessary to estimate the temperatures of the ECU and the motor and control the motor so that the temperatures of the ECU and the motor do not exceed respective permissible heat generation temperatures, that is, respective overheat temperature limits. According to JP 5477437 (US 2013/0144478 A1: patent document 1), for example, the motor is prohibited from being driven to protect the ECU and the motor when an estimated temperature of the ECU or the motor reaches the permissible heat generation temperature.

When the driver turns on and off an ignition switch in the vehicle repetitively, the temperatures of the ECU and the motor also rise similarly to the case that the shift range is switched over repetitively. This is because initial driving control is performed to learn a relative position between a rotation position of a rotor and a current supply phase of the motor, which is necessary for the shift range switchover control, when power supply is started to the ECU. According to JP 5093624 (US 2011/0175563 A1: patent document 2), for example, even when the ignition switch is turned off, the power supply to the ECU is continued without immediately turning off a main relay until a predetermined prohibition period elapses. As a result, even when the driver repeats turning on and off the power supply in the prohibition period, normal motor control is performed without performing the initial driving control each time the power supply is started. Thus heat generation of the motor is reduced.

According to heat protection control and heat generation suppression control performed in patent document 1 and patent document 2, it is not possible to estimate temperatures when the power supply to the ECU is turned off. For this reason, a setting of motor temperature estimated at the time of starting the motor control when the power supply to the ECU is turned on again and a setting of main relay turn-off prohibition period after the turn-off of the ignition switch need be improved.

In patent document 1, the motor will not be protected properly in a case that the ignition switch is turned on again immediately after the ignition switch was turned off with the estimated motor temperature being close to the permissible heat generation temperature, if the motor temperature at the restart time is set to a product-mounting environment temperature.

In patent document 2, it is likely that the motor temperature cannot be estimated properly after the ignition switch is turned on again, if the motor temperature remains to be higher than the product-mounting environment temperature after elapse of the prohibition period. To avoid this problem, the prohibition period may be set longer, for example, to surely lower the motor temperature to the product-mounting environment temperature. With such a long prohibition period, when the driver does not make the shift range switchover request operations or turn on and off the ignition switch repetitively, the power supply to the ECU is continued even when the estimated motor temperature has already fallen to the product-mounting environment temperature. Since this causes discharging of a battery unnecessarily, the prohibition period need be set properly.

SUMMARY

It is therefore an object to provide a shift range switchover control device for a vehicle, which estimates a temperature of an actuator properly.

A shift range switchover control device, which controls an actuator provided to switch over a shift range of a vehicle, comprises a temperature estimation part and a driving control part. The temperature estimation part estimates a temperature of the actuator based on a driving state of the actuator. The driving control part controls driving of the actuator, and limits the driving of the actuator when an estimated temperature of the actuator exceeds a protection temperature. The temperature estimation part calculates, based on a final temperature indicating the estimated temperature of a system stop time, a restart-time temperature, which is the estimated temperature at time of turning on a starting switch of the vehicle again after turning off the starting switch, or a delay period, during which the temperature estimation part continues to calculate the estimated temperature after turning off of the starting switch.

BRIEF DESCRIPTION OF THE DRAWINGS

FIG. 13 is a time chart showing temperature estimation processing executed in the third embodiment; and FIG. 14 is a time chart showing the temperature estimation processing executed in the third embodiment.

EMBODIMENT

Figure 1:
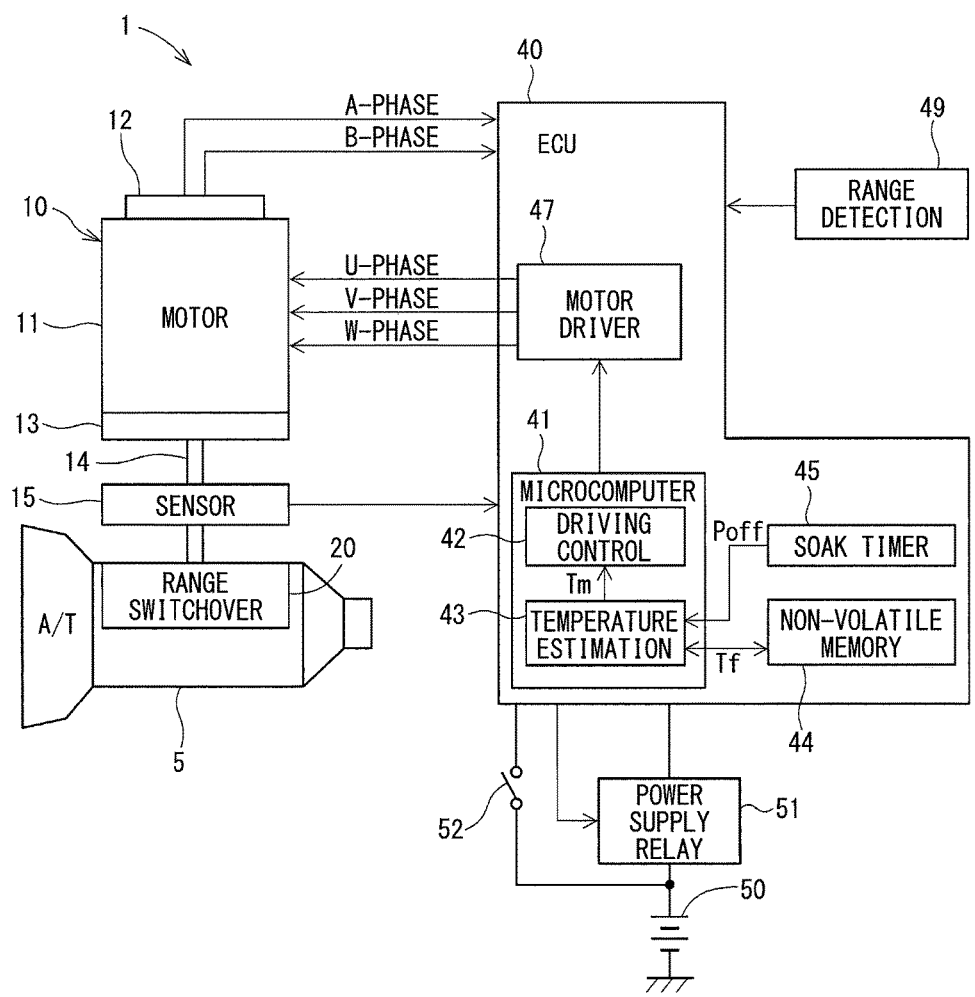
FIG. 1 is a block diagram showing shift-by-wire system including a shift range switchover device for a transmission of a vehicle according to a first embodiment.

A shift range switchover control device of a transmission for a vehicle will be described below with reference to the drawings. In plural embodiments described below, substantially same structures will be designated with same reference numerals thereby to simplify the description.

First Embodiment

Figure 2:
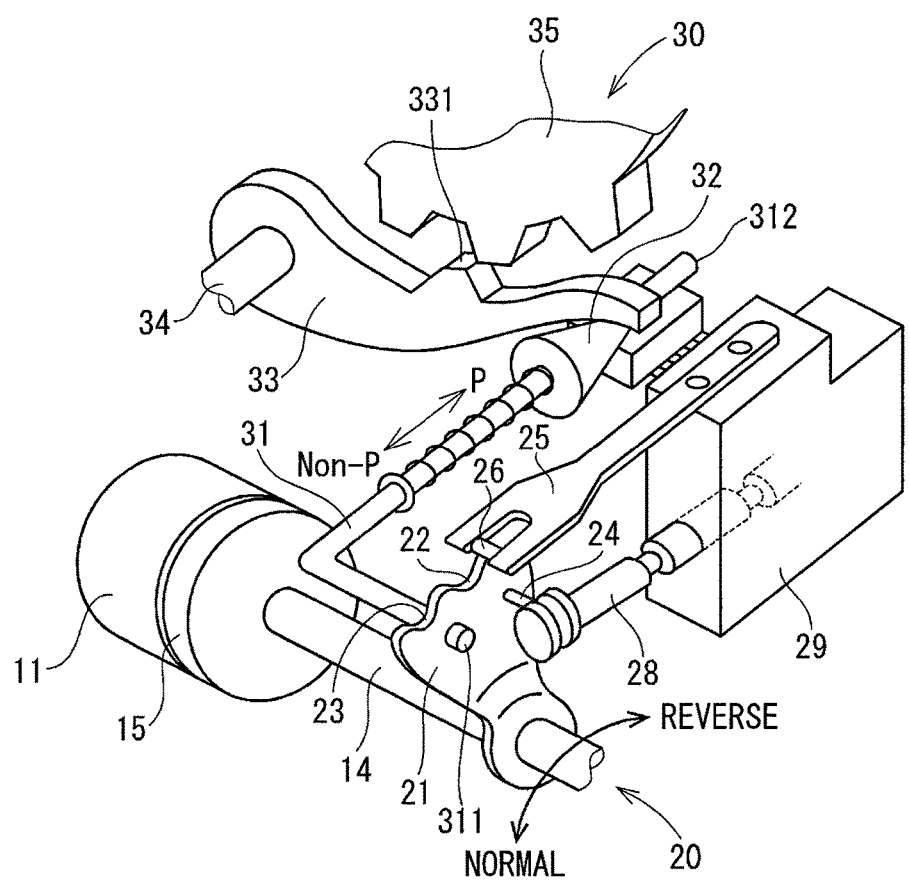
FIG. 2 is a perspective view of the shift-by-wire system shown in FIG. 1.

A shift range switchover control device for an automatic transmission of a vehicle according to a first embodiment is shown in FIG. 1 to FIG. 7. As shown in FIG. 1 and FIG. 2, a shift-by-wire system 1 includes an actuator 10, a shift range switchover mechanism 20 of an automatic transmission 5 and a shift range switchover ECU 40, which is a shift range switchover control device.

The actuator 10 includes a motor 11, an encoder 12, a reduction device 13, an output shaft 14 and the like. The motor 11 rotates with power supply form a battery 50, which is mounted in a vehicle (not shown), and operates as a driving power source for the shift range switchover mechanism 20.

The motor 11 is an SR motor, which has stator and a rotor both having salient poles. Since no permanent magnet is needed, it is simple in structure.

The encoder 12 detects a rotation position of the rotor. The encoder is, for example, a magnetic rotary encoder, which includes a magnet rotatable with the rotor and a Hall ICs for detecting magnetism. The encoder 12 generates an A-phase pulse signal and a B-phase pulse signal at every predetermined angular rotation in synchronization with rotation of the rotor. The reduction device 13 outputs rotation of the motor 11 from its output shaft 14 after reducing a rotation speed and transfers it to the shift range switchover mechanism 20. An output shaft sensor 15 is provided on the output shaft 14 to detect a rotation angle of the output shaft 14. The output shaft sensor 15 is for example a potentiometer. The rotation angle of the output shaft sensor 15 corresponds to a present shift range of the automatic transmission 5.

As shown in FIG. 2, the shift range switchover mechanism 20 includes a detent plate 21, a detent spring 25 and the like to transfer a rotary driving force outputted from the reduction device 13 to a manual valve 28 and a parking lock mechanism 30. The detent plate 21 is fixed to the output shaft 14 and driven by the actuator 10. The detent plate 21 is provided with a pin 24, which protrudes in parallel with the output shaft 14. The pin 24 is linked with the manual valve 28. Since the detent plate 21 is driven to rotate by the actuator 10, the manual valve 28 reciprocally moves in its axial direction. That is, the shift range switchover mechanism 20 transfers driving force of the actuator 10 to the manual valve 28 after changing rotary movement of the actuator 10 to linear movement. The manual valve 28 is provided in a valve body 29. When the manual valve 28 moves reciprocally in the axial direction, a hydraulic supply path of hydraulic fluid to a hydraulic clutch (not shown) is switched over and an engagement state of the hydraulic clutch is switched over. With this switchover operation, the shift range of the automatic transmission 5 is changed. The detent plate 21 is provided with recessed parts 22 and 23 on the detent spring 25 side. In the first embodiment, the recessed part 22 and the recessed part 23 are provided at positions, which are close to and remote from a base of the detent spring 25, respectively.

The detent spring 25 is a plate member, which is resiliently deformable and has a detent roller 26 at its top end. The detent roller 26 fits in either one of the recessed parts 22 and 23. Fitting of the detent roller 26 in the recessed part 23 and the recessed part 22 correspond to a P range and a non-P range, respectively.

The detent spring 25 biases the detent roller 26 in a direction toward a rotation center of the detent plate 21. When a rotary force applied to the detent plate 21 exceeds a predetermined level, the detent spring 25 flexes and resiliently deforms and the detent roller 26 moves from one of the recessed parts 22 and 23 to the other of the recessed parts 22 and 23. When the detent roller 26 fits in either one of the recessed parts 22 and 23, the detent plate 21 is restricted from pivotally swinging. The axial position of the manual valve 28 and the state of the parking lock mechanism 30 are thus determined and the shift range of the automatic transmission 5 is fixed.

The parking lock mechanism 30 includes a parking rod 31, a conical body 32, a parking lock pawl 33, a shaft part 34 and a parking gear 35. The parking rod 31 is formed in a generally L-shape and its one end 311 side is fixed to the detent plate 21. The conical body 32 is provided on the other end 312 side of the parking rod 31. The conical body 32 is formed to have a diameter, which gradually decreases toward the other end 312 side. When the detent plate 21 is driven to swing in a reverse direction of rotation, the conical body 32 moves in a direction of an arrow P. The parking lock pawl 33 is configured to contact a conical surface of the conical body 32 and swing about around the shaft part 34. On the parking gear 35 side of the parking lock pawl 33, a protruded part 331 is formed to be engageable with the parking gear 35.

The parking gear 35 is provided on an axle (not shown) to be engageable with the parking lock pawl 33. When the parking gear 35 and the parking lock pawl 33 engages each other, the axle is restricted from rotation. When the shift range is not the non-P range, the parking gear 35 is not locked by the parking lock pawl 33 and hence the axle is not restricted from rotating by the parking lock mechanism 30. When the shift range is the P range, the parking gear 35 is locked by the parking lock pawl 33 and hence the axle is restricted from rotating.

Referring to FIG. 1 again, the shift range switchover ECU 40 includes a microcomputer 41, a non-volatile memory 44, a soak timer 45, a motor driver 47 and the like. The shift range switchover ECU 40 is simply referred to as the ECU 40. The ECU 40 is supplied with electric power from the battery 50 mounted in a vehicle through a power supply relay 51. The ECU 40 generates a command to turn off the power supply relay 51, when a delay period Ph elapses after an ignition switch 52 is turned off. The ignition switch 52 is a starting switch for the shift-by-wire system. When the power supply relay 51 is turned off, power supply from the battery 50 to the ECU 40 is turned off and the ECU 40 remains in an off-state, that is, is disabled to operate. In the first embodiment, the delay period Ph is predetermined in correspondence to a period required for the ECU 40 to complete shutdown processing.

The microcomputer 41 has as functional blocks a driving control part 42 and a temperature estimation part 43. The driving control part 42 controls rotational driving of the motor 11 by counting a rising edge and a falling edge of the A-phase signal and the B-phase signal generated from the encoder 12 and switching over current supply phases of the motor 11 in correspondence to the count values in the conventional manner. The motor driver 47 outputs driving signals, which are related to three phases (U-phase, V-phase and W-phase) of the motor 11.

The temperature estimation part 43 estimates a temperature of the actuator 10, for example, motor 11. The estimated temperature of the motor 11 is assumed to be Tm. The temperature estimation part 43 continues to calculate the estimated temperature Tm as long as the ECU 40 is operable. Details of temperature estimation will be described later. At least a part of the processing of the driving control part 42 and the temperature estimation part 43 is not limited to software processing by the microcomputer 41 but may be hardware processing by specific electronic circuits.

The non-volatile memory 44 stores the estimated temperature Tm, which is present when the ignition switch 52 as the starting switch is turned off, as a final temperature Tf. The time of turning off of the ignition switch 52 is referred to as a system stop time. The ignition switch 52 is simply referred to as IG 52.

The soak timer 45 measures an off period Poff, during which the IG 52 remains turned off. The soak timer 45 is supplied with electric power directly from the battery 50 and continues to measure the off period Poff even when the ECU 40 is in the off-state. In the first embodiment, the off period Poff is measured by counting up its count value at every predetermined interval (for example, one minute). A shift range detection part 49 detects a position of a shift switch (not shown), which is manipulated by the driver, and outputs a detected position to the ECU 40.

When the power supply to the ECU 40 is started, the driving control part 42 performs initial learning to match the count value of the encoder and an actual rotor position of the motor 11. Specifically, the rotation position and the current supply phase of the rotor are synchronized by rotating the motor 11 in a normal direction or a reverse direction of rotation. When the shift range detection part 49 detects a switchover of the shift range from one of the P range and the non-P range to the other of the P range and the non-P range because of driver's manipulation of the driver on a shift switch (not shown) after turning on of the IG 52, the driving control part 42 drives the motor 11 in the normal rotation direction or in the reverse rotation direction in response to a change in the selected range before and after the switchover. Thus, the shift range is switched over to a range, which is selected by the driver and detected by the shift range detection part 49. The details of the initial learning and the driving control of the motor 11 are known well and hence no detailed description will be made.

The temperature estimation of the motor 11 will be described next. The temperature estimation part 43 estimates a temperature of the motor 11 in correspondence to an operation state of the motor 11. In the first embodiment, the temperature estimation part 43 sets the estimated temperature Tm to an initial temperature Td, which is predetermined to corresponds to an ambient temperature of a surrounding area around the motor 11. The initial temperature Td is 120° C., for example. The initial temperature Td may be represented as initial value zero in software processing by the microcomputer 41. The temperature estimation part 43 adds a temperature increment (increase amount) ΔT to the existing estimated temperature Tm when driving of the motor 11 is started. The temperature increment ΔT is 0.1° C., for example. The temperature estimation part 43 maintains the temperature, which equals a sum of the existing temperature Tm and the temperature increment ΔT, while the motor 11 is driven continuously. While the motor 11 is not driven, the temperature estimation part 43 decreases the estimated temperature Tm at a predetermined rate as time elapses. In the temperature estimation, the direction of rotation of the motor 11 is irrelevant. When the estimated temperature Tm exceeds a protection temperature Tp, which is a permissible upper limit temperature for protection from overheating, the driving control part 42 limits driving of the motor 11 thereby to prevent overheating of the motor 11. The protection temperature Tp is 137° C., for example. The driving of the motor 11 may be limited by stopping or suppressing driving of the motor 11.

As a comparative example, it is assumed that the non-volatile memory 44 and the soak timer 45 are not provided. In this case, the temperature of the motor 11 cannot be estimated properly when the IG 52 is turned on again after the IG 52 has been turned off. For example, in a case that the temperature at the time of turning on the IG 52 again (restart-time temperature Tr) is set to the initial temperature Td, the temperature of the motor 11 is estimated to be lower than the actual temperature when the IG 52 is turned off with the estimated temperature Tm being close to the protection temperature Tp and the IG 52 is turned on again under a high temperature state of the motor 11. In this case, it is likely that the motor 11 will not be protected properly. Further, for example, in a case that the final temperature Tf is stored in the non-volatile memory 44 and the final temperature Tf is used as the restart-time temperature Tr, the temperature of the motor 11 is estimated to be higher than the actual temperature when the IG 52 is turned on under a low temperature state of the motor 11. In this case, it is likely that the overheat protection control is performed excessively although the temperature of the motor 11 has fallen already to low temperature.

In the first embodiment, therefore, the ECU 40 is provided with the non-volatile memory 44 for storing the final temperature Tf and the soak timer 45 for measuring a period, which elapses after turning off of the IG 52. The temperature estimation part 43 calculates the restart-time temperature Tr based on the final temperature Tf and the off period Poff, which indicates a period of the off-state of the IG 52 after the last turning off of the IG 52.

Figure 3:
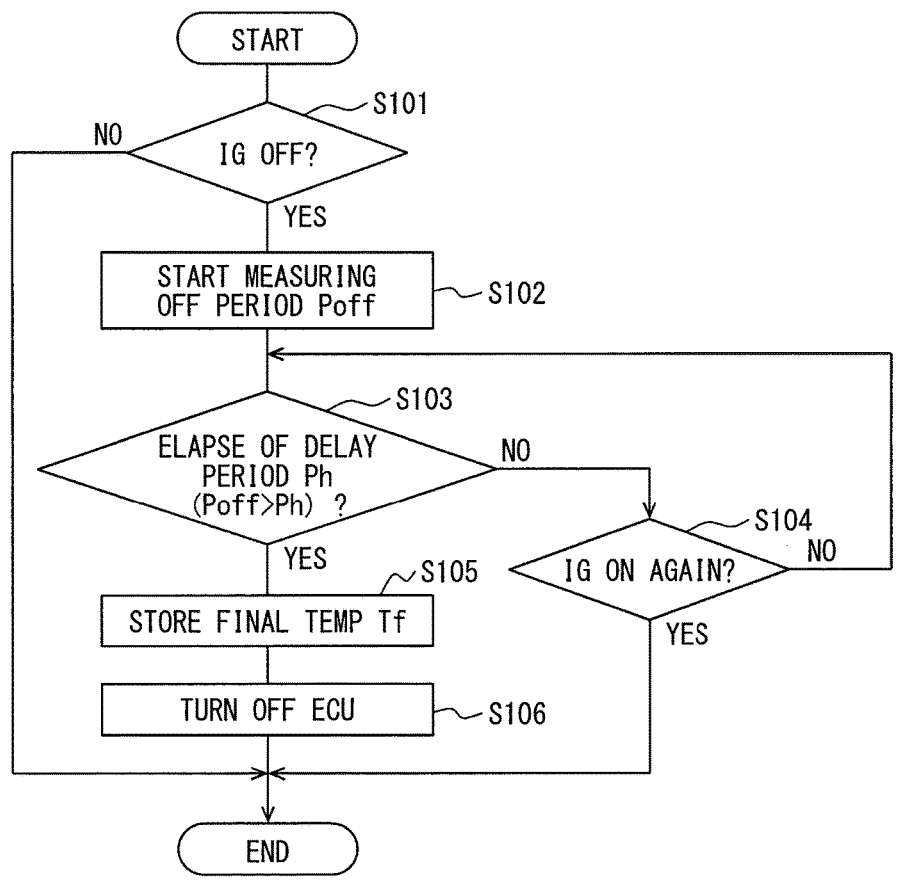
FIG. 3 is a flowchart showing system stop-time processing executed in the first embodiment.
Figure 4:
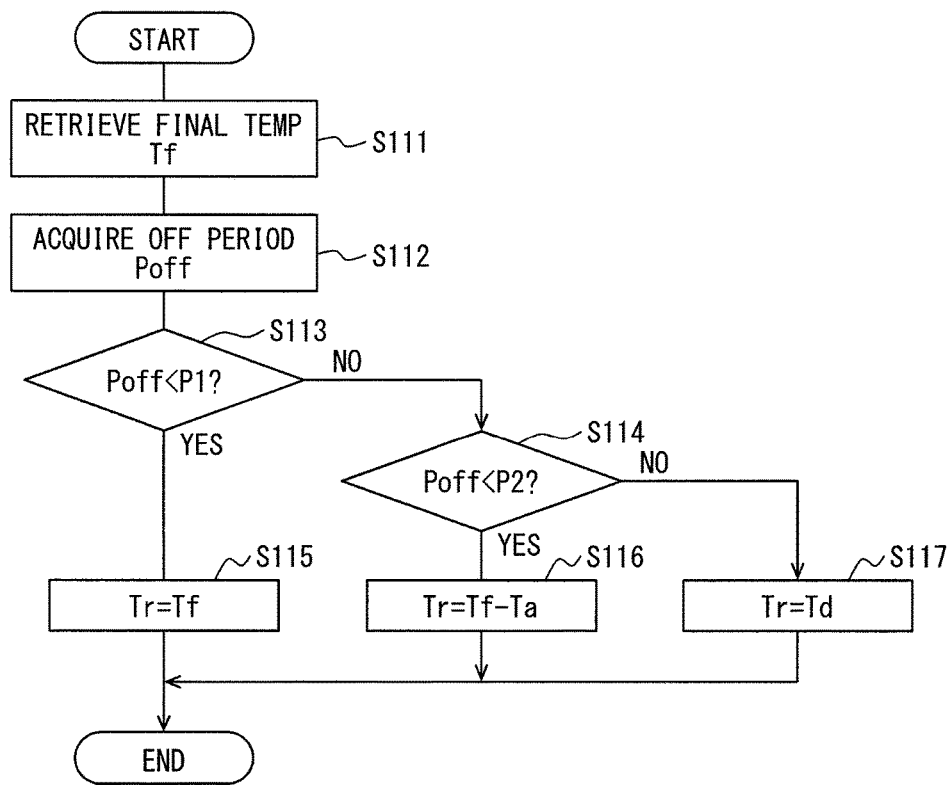
FIG. 4 is a flowchart showing system restart-time processing execute in the first embodiment.

The temperature estimation processing in the first embodiment will be described with reference to flowcharts shown in FIG. 3 and FIG. 4. FIG. 3 shows system stop-time processing and FIG. 4 shows system restart-time processing. The system stop-time processing shown in FIG. 3 is executed by the ECU 40, particularly by the microcomputer 41, at every predetermined interval. In the following description, each step of processing is simply identified as S.

At S101 first, the temperature estimation part 43 checks whether the IG 52 has been turned off. When the IG 52 has not been turned off yet (S101: NO), subsequent steps are not executed. When the IG 52 has been turned off (S101: YES), the processing is shifted to S102.

At S102, the soak timer 45 starts measuring the off period Poff. At S103, the ECU 40 checks whether a delay period Ph has elapsed after the turning off of the IG 52. When the delay period Ph has elapsed (S103: YES), that is, Poff≥Ph, the processing is shifted to S105. When the delay period Ph has not elapsed yet (S103: NO), the processing is shifted to S104.

At S104, the temperature estimation part 43 checks whether the IG 52 has been turned on again. When the IG 52 has not been turned on again (S104: NO), the processing is shifted to S103. When the IG 52 has been turned on again (S104: YES), the processing is finished. When the IG 52 has been turned on again (S104; YES), the ECU 40 is not turned off and the temperature estimation part 43 continues to estimate the temperature. In this case, the calculation of the estimated temperature Tm, which has been started before turning off of the IG 52 is continued even after the IG 52 is turned on again.

When the measured off period Poff exceeds the delay period Ph (S103: YES), the processing is shifted to S105. At S105, the temperature estimation part 43 stores by writing the estimated temperature Tm detected at the time of turning off of the IG 52 as the final temperature Tf in the non-volatile memory 44. The final temperature Tf may be written at any time, for example, before S102, as far as it is after turning off of the IG 52. At S106, the power supply relay 51 is turned off. The ECU 40 is thus disabled to operate.

The system restart-time processing shown in FIG. 4 is executed when the ECU 40 is turned on by turning on the IG 52. At S111, the temperature estimation part 43 retrieves by reading out the final temperature Tf, which has been stored at S105 in FIG. 3, from the non-volatile memory 44. At S112, the temperature estimation part 43 acquires the off period Poff from the soak timer 45. The sequence of processing S111 and processing S112 may be reversed.

At S113, the temperature estimation part 43 checks whether the off period Poff is shorter than a first check threshold period P1. The first check threshold period P1 is preset to a period, during which the temperature of the motor 11 is estimated to remain at the final temperature Tf. When the off period Poff is shorter than the first check threshold period P1 (S113: YES), the processing is shifted to S115. When the off period Poff is equal to or longer than the first check threshold period P1 (S113: NO), the processing is shifted to S114.

At S114, the temperature estimation part 43 checks whether the off period Poff is shorter than a second check threshold period P2, which is longer than the first check threshold period P1. The second check threshold period P2 is preset to a period, during which the temperature of the motor 11 is estimated to fall to the initial temperature Td. When the off period Poff is shorter than the second check threshold period P2 (S114: YES), the processing is shifted to S116. When the off period Poff is equal to or longer than the first check threshold period P2 (S114: NO), the processing is shifted to S117.

When the off period Poff is shorter than the first check threshold period P1 (S113: YES), the processing is shifted to S115. At S115, the temperature estimation part 43 sets the restart-time temperature Tr to the final temperature Tf.

When the off period Poff is equal to or longer than the first check threshold period P1 and shorter than the second check threshold period P2 (S113: NO and S114: YES), the processing is shifted to S116. At S116, the temperature estimation part 43 sets the restart-time temperature Tr to a value, which is calculated by negatively correcting the final temperature Tf. More specifically, the temperature estimation part 43 calculates a correction temperature Ta based on the off period Poff and calculates the restart-time temperature Tr as Tr=Tf−Ta. The correction temperature Ta is 17° C. when the off period Poff is 30 minutes, for example.

Figure 5:
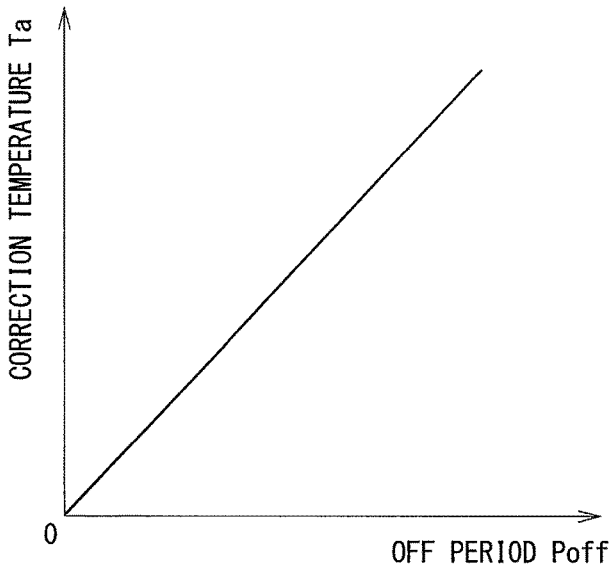
FIG. 5 is a map showing a relation between an off time and a corrected temperature in the first embodiment.

The correction temperature Ta is calculated based on the off period Poff by using, for example, data map shown in FIG. 5. The data map shown in FIG. 5 is pre-stored, as a relation between the off period Poff and a magnitude of temperature fall of the motor 11, in a memory (not shown) of the ECU 40. FIG. 5 exemplarily shows the relation between the off period Poff and the correction temperature Ta to be linear. However, as far as the correction temperature Ta increases as the off period Poff increases, the relation may be set in any other relations such as a quadratic or higher-order function. The correction temperature Ta may be calculated mathematically as a function of the off period Poff in place of using the data map. In a case that the restart-time temperature Tr calculated as Tr=Tf−Ta is lower than the initial temperature Td, the restart-time temperature Tr is set to the initial temperature Td. When the off period Poff is equal to or longer than the first check threshold period P2, the processing is shifted to S117. At S117, the temperature estimation part 43 sets the restart-time temperature Tr to the initial temperature Td.

Figure 6:
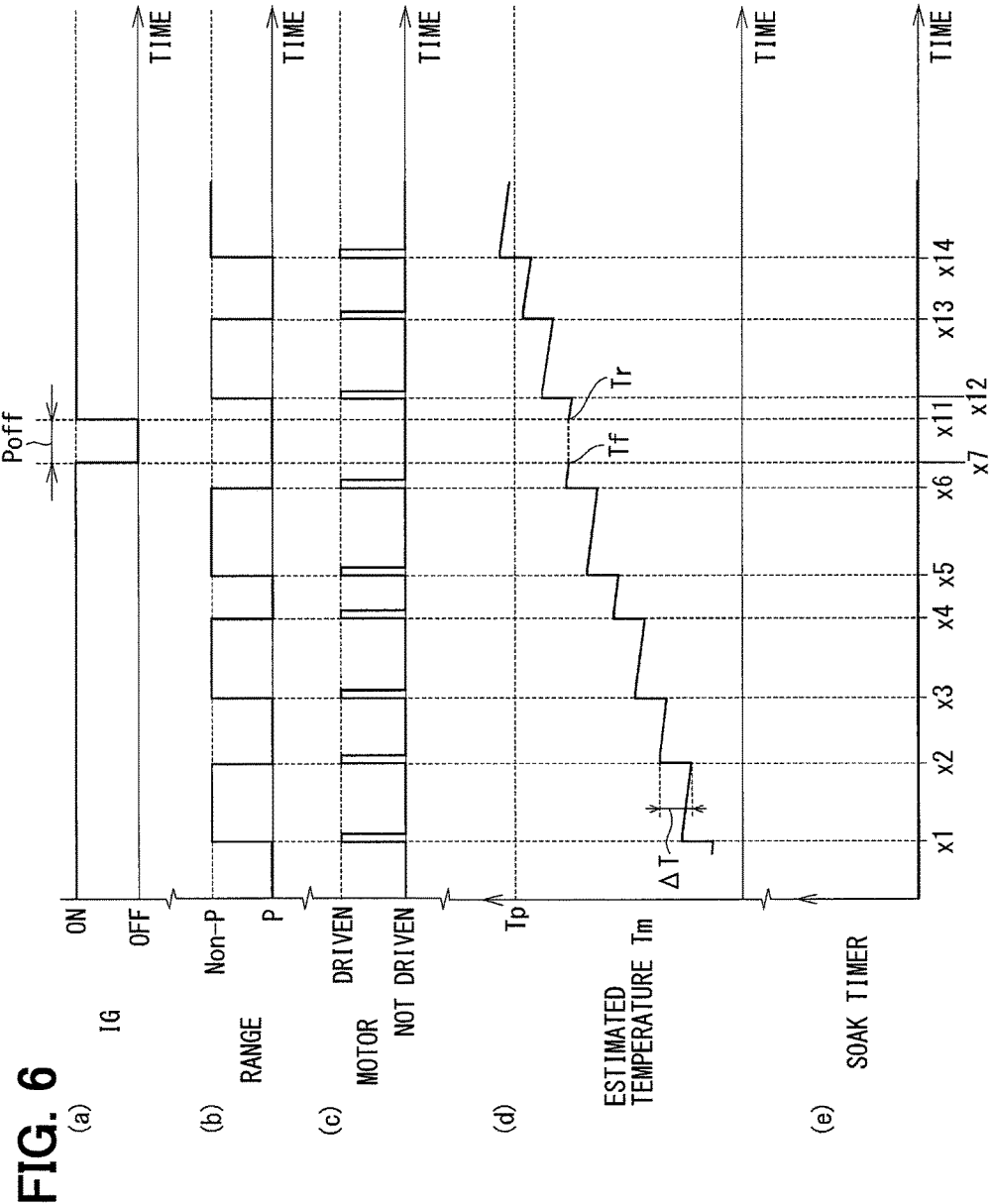
FIG. 6 is a time chart showing temperature estimation processing executed in the first embodiment.
Figure 7:
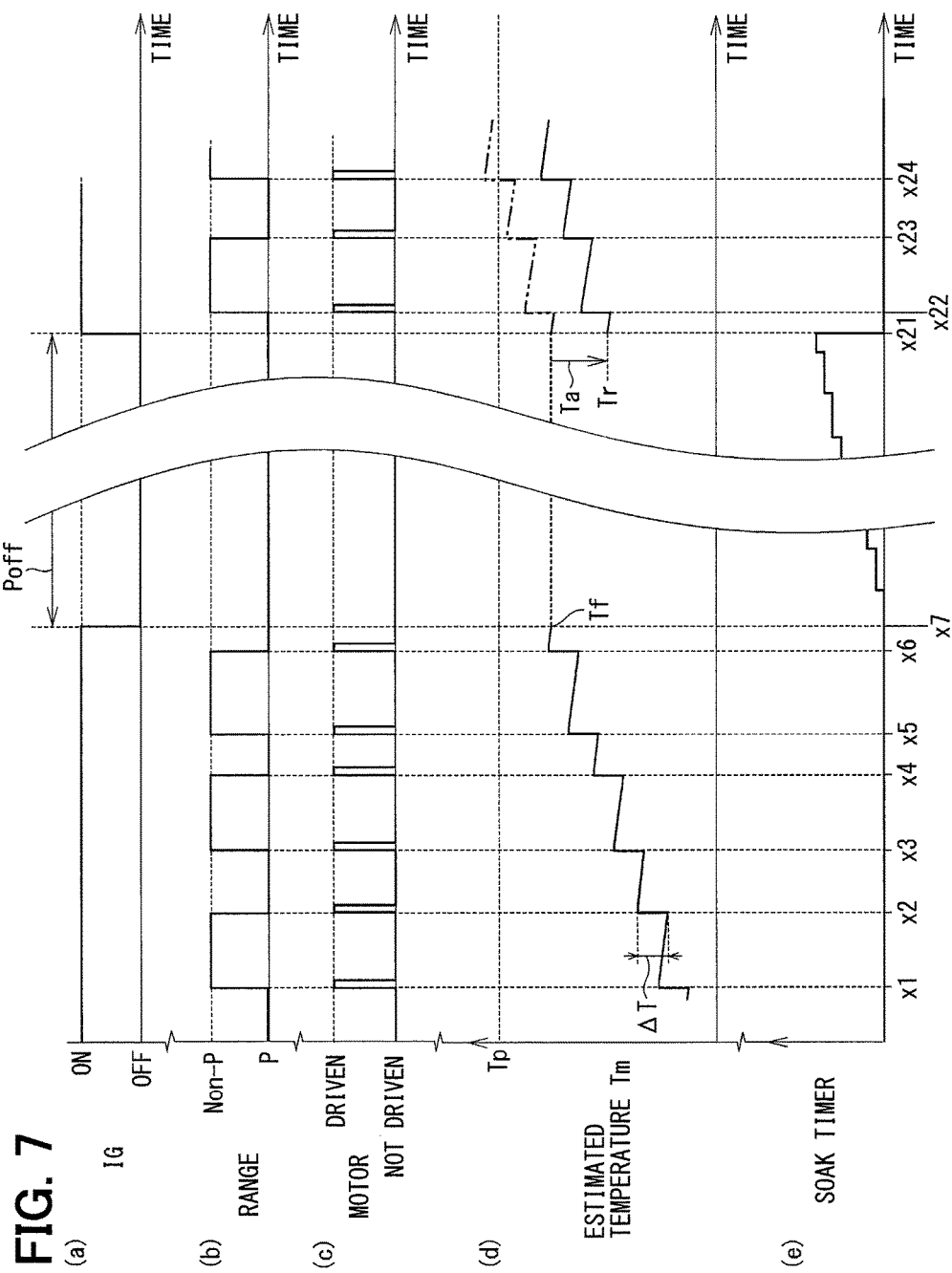
FIG. 7 is a time chart showing the temperature estimation processing execute in the first embodiment.
Figure 8:
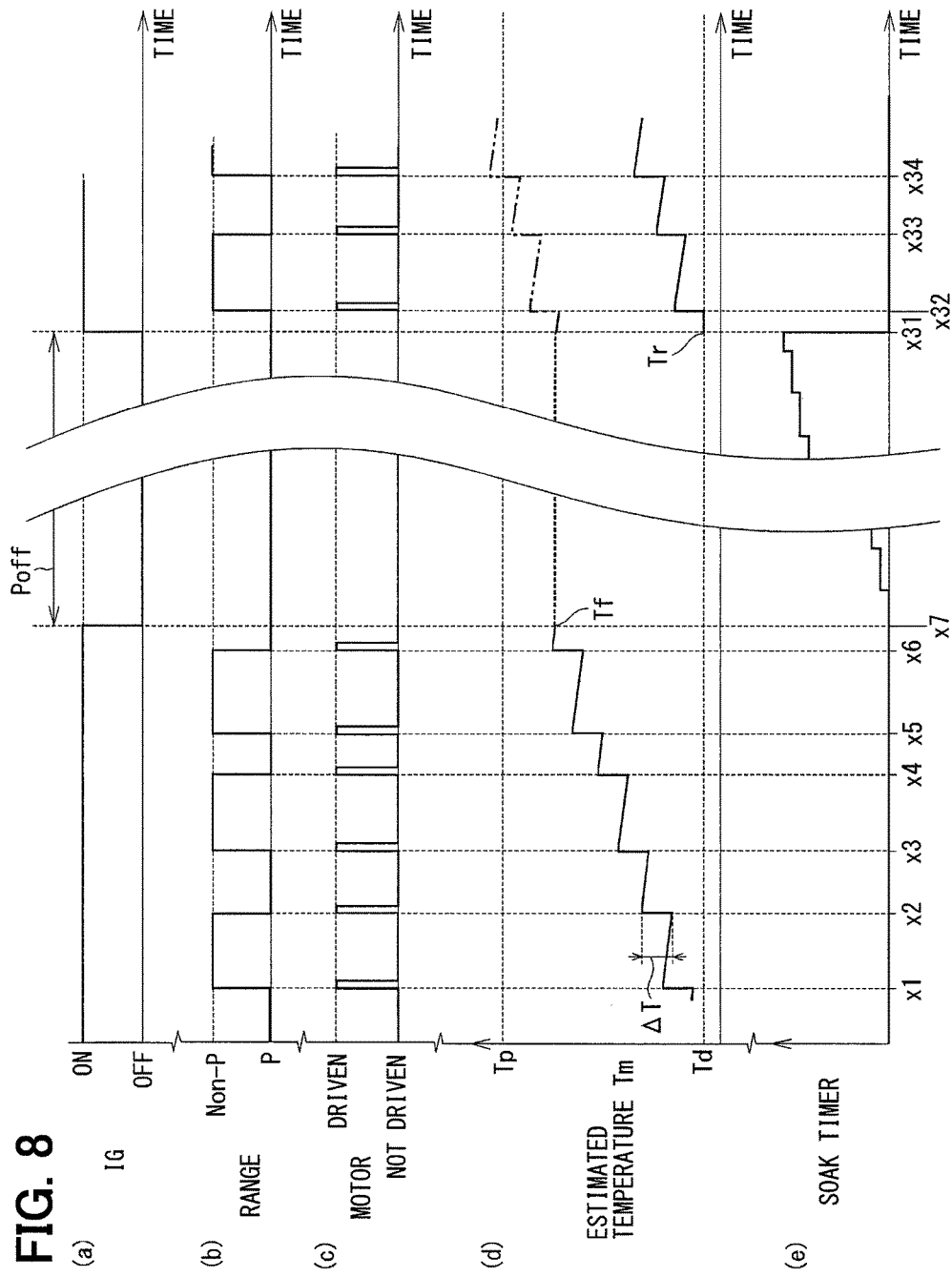
FIG. 8 is a time chart showing the temperature estimation processing executed in the first embodiment.

The temperature estimation processing in the first embodiment will be described below with reference to time charts of FIG. 6 to FIG. 8. In FIG. 6 to FIG. 8, (a) is an on-off state of the IG 52, (b) is the shift range detected by the shift range detection part 49, (c) is the operation state of the motor 11, (d) is the estimated temperature Tm of the motor 11 and (e) is the period measured by the soak timer 45. It is noted that scales of the ordinate axis and the abscissa axis do not correspond to actual scales because the axes are scaled up or scaled down arbitrarily. In FIG. 6 to FIG. 8, for simplicity, the delay period Ph from turning off of the IG 52 to turning off of the ECU 40 is shown to be very short, assuming that the ECU 40 is turned off immediately after the IG 52 has been turned off.

As shown in FIG. 6, at times x1, x2, x3, x4 and x5, which are before the IG 52 is turned off, the motor 11 is driven each time the shift range is changed from one of the P range and the non-P range to the other of the P range and the non-P range. When the motor 11 is driven, the temperature estimation part 43 increases the estimated temperature Tm by the temperature increment (change amount) ΔT. As long as the motor 11 continues to be driven, the increased temperature is maintained. When driving of the motor 11 is stopped, that is, the motor 11 is not driven, the temperature estimation part 43 decreases the estimated temperature at the predetermined rate with time.

When the IG 52 is turned off at time x7, the temperature estimation part 43 stores the final temperature Tf in the non-volatile memory 44. The IG 52 is assumed to be turned on again at time x11. In the example shown in FIG. 6, the off period Poff, which is from time x7 to time x11, is assumed to be shorter than the first check threshold period P1. As a result, the temperature of the motor 11 is assumed to have not fallen from the final temperature Tf and the restart-time temperature Tr is set to the final temperature Tf.

When the shift range is switched over by the driver at time x12, x13 and x14, the temperature estimation part 43 calculates the estimated temperature Tm based on the driving state of the motor 11. This is also true at time x22, x23 and x24 in FIG. 7, at time x32, x33 and x34 in FIG. 8, at time x42, x43 and x44 in FIG. 13 and at time x62, x63 and x64 in FIG. 14. In the example shown in FIG. 6, the off period Poff is short and hence the restart-time temperature Tr is high. For this reason, when the estimated temperature Tm exceeds the protection temperature Tp at the time the shift range is switched over at time x14 for example, the motor 11 is limited from being driven until the estimated temperature Tm falls to be lower than the protection temperature Tp after time x14. It is thus possible to protect the motor 11 from overheating.

In the example shown in FIG. 7, the ECU 40 operates similarly as shown in FIG. 6 until the IG 52 is turned off at time x7. In the example shown in FIG. 7, the off period Poff from time x7 to time x21 is equal to or longer than the first check threshold period P1 but shorter than the second check threshold period P2. As long as the IG 52 remains in the off-state, the shift range is not switched over normally. Since the motor 11 is not driven, the temperature of the motor 11 falls. In a case that the restart-time temperature Tr is set to the final temperature Tf similarly to the example in FIG. 6, the estimated temperature Tm is calculated to be higher than the actual temperature of the motor 11 as indicated by a two-dot chain line in (d) of FIG. 7. When the estimated temperature Tm exceeds the protection temperature Tp, driving of the motor 11 is limited for protection from overheating. For this reason, if the estimated temperature Tm is calculated to be higher than the actual temperature, it is likely that the overheat protection control is performed unnecessarily. For this reason, in a case that the off period Poff is between the first check threshold value P1 and the second check threshold period P2, the restart-time temperature Tr is set to the value, which results from negatively correcting the final temperature Tf by the correction temperature Ta based on the off period Poff. That is, the restart-time temperature Tr is set to be lower than the final temperature Tf as indicated by a solid line in (d) of FIG. 7.

Further in the example shown in FIG. 8, the ECU 40 operates similarly as shown in FIG. 6 until the IG 52 is turned off at time x7. In the example shown in FIG. 8, the off period Poff from time x7 to time x31 is equal to or longer than the second check threshold period P2. In the example shown in FIG. 8, it is highly likely that the temperature of the motor 11 has fallen sufficiently because the off period Poff is sufficiently long. For this reason, the restart-time temperature Tr is set to the initial temperature Td as indicated by a solid line in (d) of FIG. 8. Since the temperature of the motor 11 after the IG 52 is turned on again is thus estimated properly, it is possible to avoid the overheat protection control from being performed excessively.

As described above, the ECU 40 according to the first embodiment controls the motor 11 of the actuator 10 provided for switching over the shift range of the automatic transmission 5 in the vehicle and includes the driving control part 42 and the temperature estimation part 43. The temperature estimation part 43 estimates the temperature of the motor 11 based on the driving state of the motor 11. The driving control part 42 controls driving of the motor 11 of the actuator 10 and limits driving of the motor 11 when the estimated temperature Tm exceeds the protection temperature Tp.

The temperature estimation part 43 calculates the restart-time temperature Tr, which the motor 11 is estimated to take when the IG 52 of the vehicle is turned on again after the IG 52 has been turned off previously, based on the final temperature Tf, which is the estimated temperature Tm of the motor 11 at the time of system stop time, that is, when the IG 52 is turned off. It is thus possible to easily estimate the temperature of the motor 11 when the IG 52 is turned on again after having been turned off.

Specifically, the ECU 40 further includes the non-volatile memory 44 for storing the final temperature Tf even after the power supply to the ECU 40 is turned off by turning off the IG 52 and the power supply relay 51. The temperature estimation part 43 estimates by calculation the restart-time temperature Tr based on the final temperature Tf retrieved from the non-volatile memory 44 and the off period Poff, which elapsed after stopping the operation of the system.

Since the restart-time temperature Tr is thus estimated properly, the overheat protection can be performed properly. The temperature estimation part 43 acquires the off period Poff from the soak timer 45 provided in the ECU 40. Since the soak timer 45 is provided inside the ECU 40, reliability is increased in comparison to a case, in which information related to the off time period Poff is acquired from other ECU or the like.

The temperature estimation part 43 sets the restart-time temperature Tr to the final temperature Tf when the off period Poff is shorter than the first check threshold period P1. The temperature estimation part 43 sets the restart-time temperature Tr to the value, which is determined by negatively correcting the final temperature Tf in accordance with the off period Poff, when the off period Poff is equal to or longer than the first check threshold period P1 and shorter than the first check threshold period P2. The temperature estimation part 43 sets the restart-time temperature Tr to the initial temperature Td, when the off period Poff is equal to or longer than the second check threshold period P2.

When the off period Poff is relatively long, for example, longer than the first check threshold period P1, the estimated temperature Tm is calculated properly in accordance with a temperature decrease in the period of stopping driving of the motor 11 by setting the restart-time temperature Tr to the negatively corrected temperature, which is lower than the final temperature Tf, or the initial temperature Td. It is thus possible to properly perform the overheat protection control. Further, since the overheat protection control is not performed excessively, the driving of the motor 11 is not controlled even when the driver switches over the shift range comparatively frequently.

Second Embodiment

Figure 9:
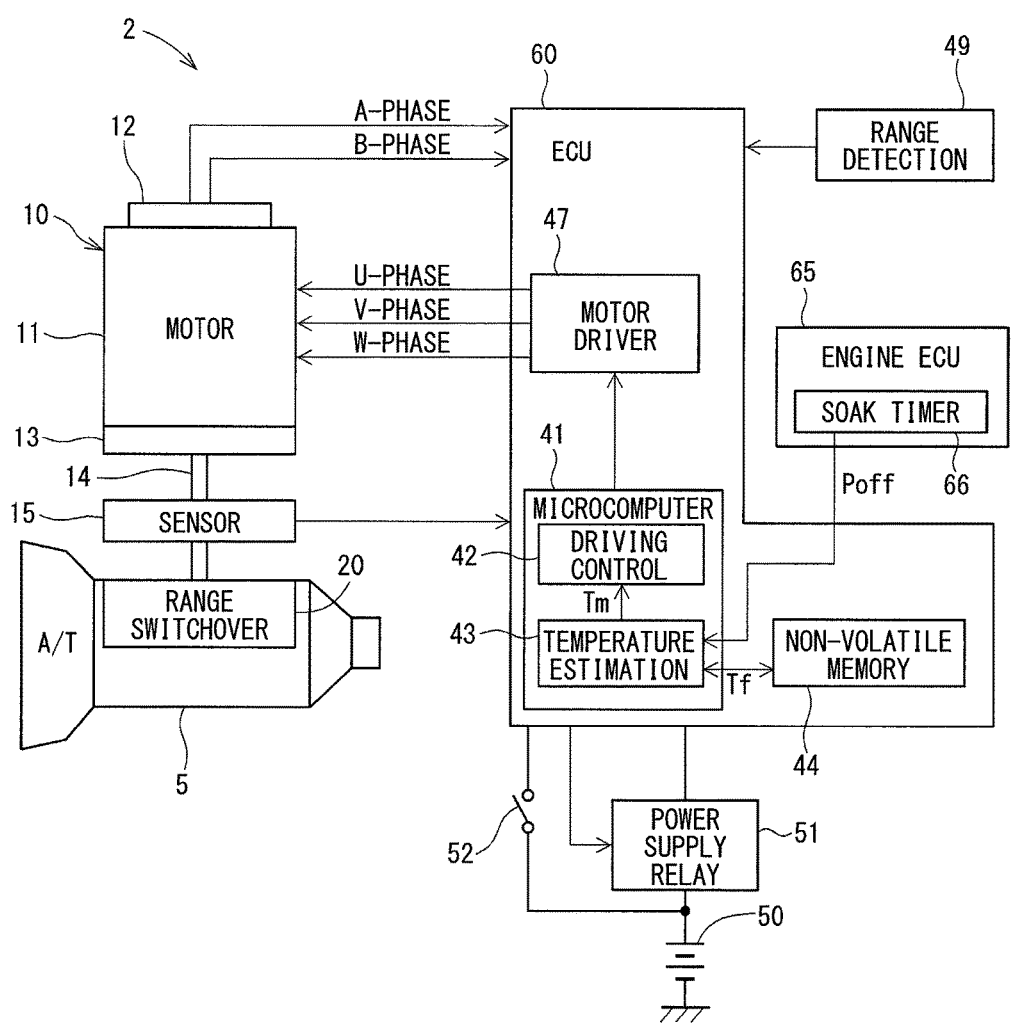
FIG. 9 is a block diagram showing a shift-by-wire system including a shift range switchover device for a transmission of a vehicle according to a second embodiment.

A second embodiment of a shift range switchover control device is shown in FIG. 9. As shown in FIG. 9, a shift-by-wire system 2 includes a shift range switchover ECU 60, which is different from that of the first embodiment. The ECU 60 includes the microcomputer 41, the non-volatile memory 44 and the motor driver 47 but does not include the soak timer therein.

In the second embodiment, the temperature estimation part 43 acquires the off period Poff from a soak timer 66, which is provided as a timer in an engine ECU 65, which is an engine control unit for controlling driving of the engine. Transmission and reception of signals between the ECU 60 and the ECU 65 may be made via signal lines, which directly connect the ECU 60 and the ECU 65 or via a network such as the controller area network (CAN). Temperature estimation processing in the second embodiment may be performed in the same way as in the first embodiment except that the off period Poff is acquired from the soak timer 66 of the ECU 65.

Since the ECU 60 uses the information of the soak timer 66 of the ECU 65, no timer need be provided in the ECU 60. The configuration of the ECU 60 is simplified. The second embodiment also provides the similar advantages as the first embodiment.

Third Embodiment

Figure 10:
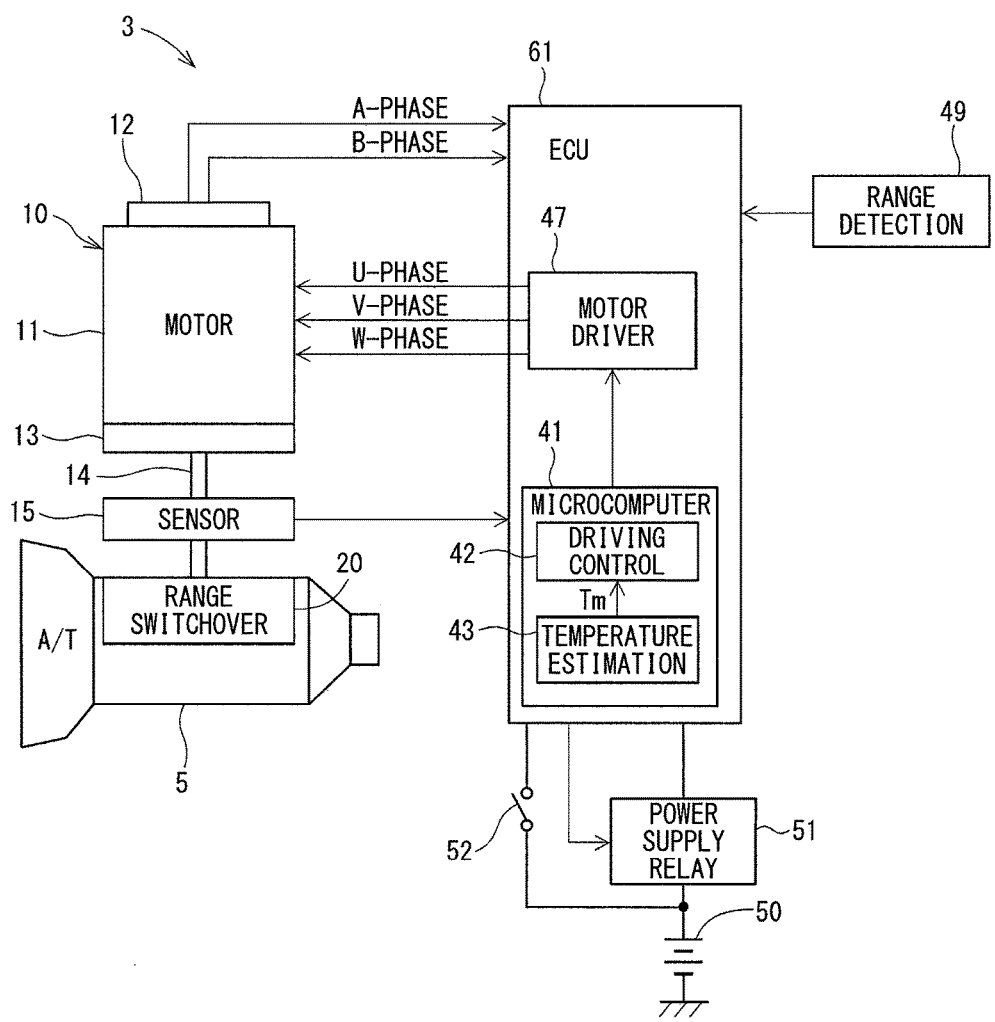
FIG. 10 is a block diagram showing a shift-by-wire system including a shift range switchover device for a transmission of a vehicle according to a third embodiment.

A third embodiment of a shift range switchover control device is shown in FIG. 10 to FIG. 14. As shown in FIG. 10, a shift-by-wire system 3 includes a shift range switchover ECU 61, which is different from that of the embodiments described above.

The ECU 61 includes the microcomputer 41 and the motor driver 47. Since the ECU 61 includes no non-volatile memory, the final temperature Tf cannot be maintained after the ECU 61 is turned off, that is, after the power supply to the ECU 61 is turned off by turning off the IG 52 and the power supply relay 51. For this reason, the temperature estimation part 43 sets the restart-time temperature Tr to the initial temperature Td when the ECU 61 is turned on again after having been turned off. The temperature estimation part 43 does not acquire the off period Poff.

Figure 11:
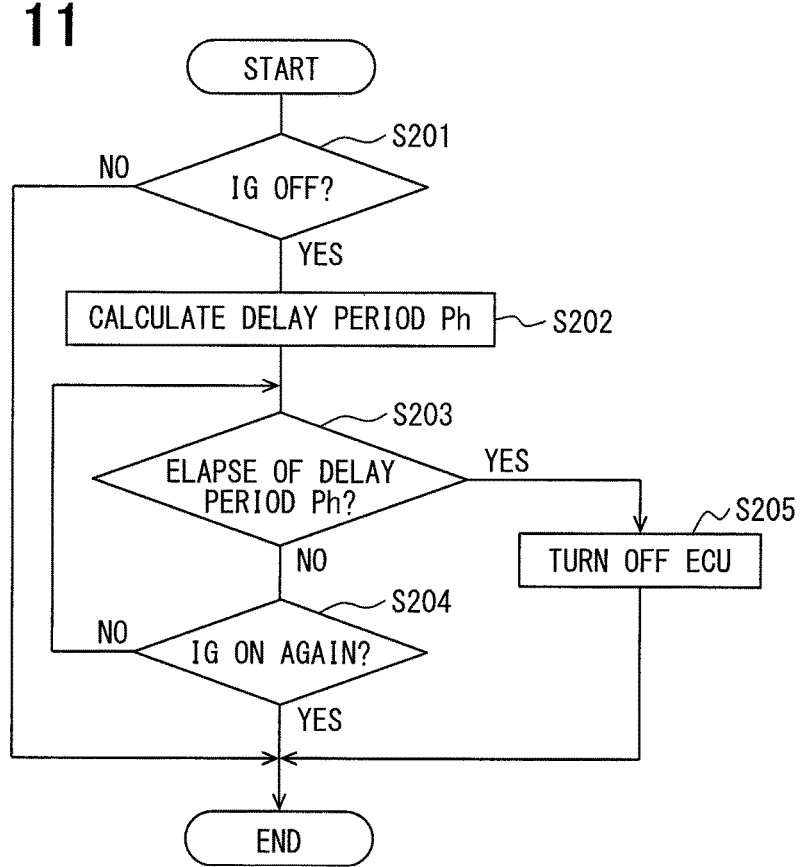
FIG. 11 is a flowchart showing temperature estimation processing executed in the third embodiment.

Temperature estimation processing in the third embodiment will be described with reference to a flowchart shown in FIG. 11. This processing is executed at a predetermined interval by the ECU 61, particularly by the microcomputer 41. The temperature estimation part 43 checks at S201 whether the IG 52 has been turned off. When the IG 52 had not been turned off (S201: NO), the temperature estimation part 43 does not execute subsequent steps. When the IG 52 has been turned off (S201: YES), the processing is shifted to S202.

At S202, the temperature estimation part 43 calculates the delay period Ph based on the final temperature Tf by setting the estimated temperature Tm at the time of turning off the IG 52 to the final temperature Tf. The delay period Ph is calculated as a period required for the temperature of the motor 11 to fall to the initial temperature Td. The delay period Ph is calculated based on a heat radiation characteristic of the motor 11, surrounding environment of the motor 11 and the like.

Figure 12:
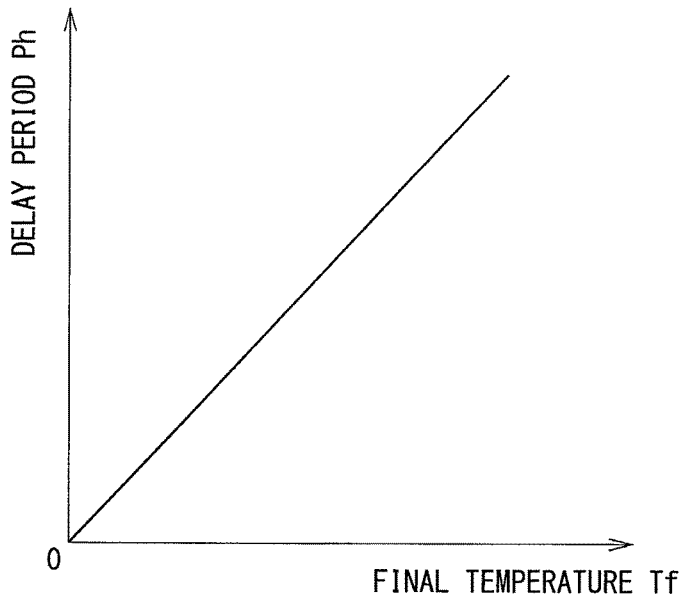
FIG. 12 is a map showing a relation between a final temperature and a delay time in the third embodiment.

The delay period Ph is calculated by using a data map shown in FIG. 12, for example. The delay period Ph is 30 minutes when the final temperature Tf is 137° C., for example. The map shown in FIG. 12 may be stored in a memory (not shown) of the ECU 61. FIG. 12 exemplarily shows the relation between the final temperature Tf and the delay period Ph to be linear. However, as far as the delay period Ph increases as the final temperature Tf increases, the relation may be set in any other relations such as a quadratic or higher-order function. The delay period Ph may be calculated mathematically in place of using the data map. When the final temperature Tf is equal to or lower than a predetermined temperature, the delay period Ph may be set to a predetermined period, which corresponds to a period required to perform the shutdown processing. When the final temperature Tf is higher than the predetermined temperature, the delay period Ph may be calculated in accordance with the final temperature Tf.

At S203, the temperature estimation part 43 checks whether the delay period Ph has elapsed after turning off of the IG 52. When the delay period Ph has elapsed (S203: YES), the processing is shifted to S205. When the delay period Ph has not elapsed yet (S203: NO), the processing is shifted to S204.

At S204, the temperature estimation part 43 checks whether the IG 52 has been turned on again. When the IG 52 has not been turned on again (S204: NO), that is, the IG 52 still remains in the off-state, the processing is shifted to S203. When the IG 52 has been turned on again (S204: YES), the processing is finished. In this case, the IG 52 has been turned on again without turning off the ECU 61 after turning off of the IG 52. The temperature estimation part 43 therefore continues calculation of the estimated temperature Tm, which has started before turning off of the IG 52.

When the delay period Ph has elapsed (S203: YES), S205 is executed. At S205, the ECU 61 turns off the power supply rely 51. Thus the ECU 61 is turned off. Since no non-volatile memory is provided in the ECU 61, the final temperature Tf is not maintained in the ECU 61. When the ECU 61 is turned on again, the temperature estimation part 43 calculates the estimated temperature Tm by setting the restart-time temperature Tr to the initial temperature Td.

Temperature estimation processing in the third embodiment will be described with reference to time charts shown in FIG. 13 and FIG. 14. In FIG. 13 and FIG. 14, (a) is an on-off state of the IG 52, (b) is the shift range, (c) is the operation state of the motor 11, (d) is the on-off state of the ECU 61 and (e) is the estimated temperature Tm of the motor 11. It is noted that scales of the ordinate axis and the abscissa axis do not correspond to actual scales because the axes in FIG. 13 and FIG. 14 are scaled up or scaled down arbitrarily.

In the example of FIG. 13, the system operates similarly as exemplified in FIG. 6 until the IG 52 is turned off at time x7. When the IG 52 is turned off at time x7, the delay period Ph is calculated based on the final temperature Tf. In the example of FIG. 13, the IG 52 is assumed to be turned on again at time x41 before the delay period Ph elapses. For this reason, the ECU 61 is not turned off and the temperature estimation part 43 continues the calculation of the estimated temperature Tm in the off period Poff. The temperature estimation part 43 further continues the calculation of the estimated temperature Tm even after the IG 52 is turned on again.

In a case that the ECU 61 is turned off after an elapse of the predetermined period Ps from turning off of the IG 52, for example, as indicated by two-dot chain line in (d) of FIG. 13, the final temperature Tf cannot be maintained without the non-volatile memory. For this reason, when the IG 52 is turned on again at time x41, the temperature estimation part 43 starts the calculation of the estimated temperature Tm by setting the temperature of the motor 11 to the initial temperature Td. In a case that the final temperature Tf is relatively high, it is likely that the IG 52 is turned on again before the temperature of the motor 11 falls to the initial temperature Td. In this case, as indicated by the two-dot chain line in (e) of FIG. 13, the estimated temperature Tm is estimated to be lower than the actual temperature of the motor 11 and the overheat protection control may not be performed properly. In the third embodiment, however, as indicated by a solid line in FIG. 13, the ECU 61 is not turned off until the temperature of the motor 11 is assumed to have fallen to the initial temperature Td, even when the IG 52 is turned off. The temperature estimation part 43 therefore continues to calculate the estimated temperature Tm. It is thus possible to properly estimate the temperature of the motor 11 after turning on the IG 52 again, even in the case that no non-volatile memory is provided.

In the example shown in FIG. 14, it is assumed that the shift range is switched over from the non-P range to the P range at time x51 and the IG 52 is turned off at time x52. When the IG 52 is turned off at time x52, the delay period Ph is calculated based on the final temperature Tf. Until the ECU 61 is turned off, the temperature estimation part 43 continues to calculate the estimated temperature Tm.

In the example of FIG. 14, the ECU 61 is turned off at time x53, which is after the elapse of the delay period Ph. In FIG. 14, it is assumed that the estimated temperature Tm falls to the initial temperature Td at the same time as the delay period Ph elapses. However, those time points need not be the same. For example, the delay period Ph may be set so that the ECU 61 is turned off at a predetermined time point, which is later than a time point that the estimated temperature Tm is predicted to fall to the initial temperature Td. When the IG 52 is turned on again at time x61, the temperature estimation part 43 calculates the estimated temperature Tm by setting the temperature of the motor 11 to the initial temperature Td.

In a case that the shift range is switched over only infrequently before turning off of the IG 52 and the final temperature Tf is relatively low, the temperature of the motor 11 falls to the initial temperature Td in a relatively short period. For this reason, by turning off the ECU 61 at time x53, at which the temperature of the motor 11 is assumed to have fallen to the initial temperature Td, it is possible to shorten the period of continued power supply to the ECU 61 after turning off of the IG 52 in comparison to a case that the ECU 61 is turned off after a predetermined period Ps indicated by a two-dot chain line in (d) of FIG. 14. Thus it is possible to reduce discharging of the battery 50, which is for accessory devices.

Frequent switchover of the shift range in a short period may be avoided and temperature rise of the motor 11 may be reduced by properly configuring a human-machine-interface (HMI) such as arrangement and manipulability of shift switches, rejection of unnecessary manipulation or warning to a user. That is, by properly configuring HMI in addition to variably setting the delay period Ph in accordance with the final temperature Tf, the overheat protection control can be performed properly without using the non-volatile memory and the soak timer.

In the third embodiment, the temperature estimation part 43 calculates the delay period Ph, during which the estimated temperature Tm is calculated continuously after turning off of the IG 52, based on the final temperature Tf, which is the estimated temperature of the motor 11 at the time of stopping the operation of the system. It is thus possible to properly estimate the temperature of the motor 11 when the IG 52 is turned on again after turning off of the IG 52. Specifically, the temperature estimation part 43 calculates the delay period Ph to be longer as the final temperature Tf is higher. The temperature estimation part 43 further calculates the delay period Ph in accordance with a period, which is required for the temperature of the motor 11 to fall to a temperature assumed to be the initial temperature Td. In the third embodiment, in which the ECU 61 is not provided with the non-volatile memory and the soak timer, the restart-time temperature Tr can be calculated properly. As a result, the ECU 61 is simplified in configuration. In a case that the shift range is switched over infrequently before the IG 52 is turned off, the delay period Ph is shortened and the delay control is not performed unnecessarily. As a result, the battery 50 is protected from discharging unnecessarily.

Other Embodiment

In the embodiments described above, the motor 11 is driven at the time of switchover between the Non-P range and the P range but the motor 11 is not driven at the time of switchover from a neutral range (N range) to a drive range (D range) for example. In the other embodiment, the detent plate 21 may have the recessed part 23, 24 for each range (P, N, D, R and the like) and the motor 11 may be driven at each change of the shift range. In this case, similarly to the embodiments described above, the temperature estimation part 43 adds the temperature increase to the existing estimated temperature. The temperature increase may be set in correspondence to the ranges, which are selected before and after the shift range change. The method of calculation of the estimated temperature Tm is not limited to that described in the embodiments but may be any other methods.

In the embodiments described above, the system stop time is assumed to correspond to the time of turning off of the IG 52. In the other embodiment, the system stop time may be assumed to correspond to the time of turning off of the ECU 40, 60, 61. In a certain system, when the IG 52 is turned off in the Non-P range (for example, N range), the motor 11 is driven to switch over the shift range to the P range after turning off of the IG 52. In such a system, the system stop time may be assumed to correspond to time, which is after turning off of the IG 52 and at which driving the motor 11 for switching over the shift range to the P range is stopped. Further, the system stop time referred to in relation to the final temperature Tf may be set to time of turning off of the ECU and the system stop time referred to in relation to the start of measuring the off period Poff may be set to time of turning off of the IG 52. That is, the system stop time referred to in relation to the final temperature Tf and the system stop time referred to in relation to the start of measuring the off period Poff may be different from each other.

In the embodiments described above, the temperature of the motor 11 is assumed to be the temperature of the actuator 10. In the other embodiment, a temperature of a device such as the resolver 12, which is other than the motor 11, may be assumed to be the temperature of the actuator 10. In the embodiments described above, the motor 11 is the SR motor. In the other embodiment, the motor 11 may be other than the SR motor. In the embodiments described above, the starting switch is the ignition switch 52. In the other embodiment, the starting switch may be a power switch or the like in an electric vehicle.

What is claimed is:

1. A shift range switchover control device, which controls an actuator provided to switch over a shift range of a vehicle, comprising:
   a temperature estimation part for estimating a temperature of the actuator based on a driving state of the actuator; and
   a driving control part for controlling driving of the actuator and limiting the driving of the actuator when an estimated temperature of the actuator exceeds a protection temperature,
   wherein the temperature estimation part calculates, based on a final temperature indicating the estimated temperature of a system stop time, a restart-time temperature, which is the estimated temperature at time of turning on a starting switch of the vehicle again after turning off of the starting switch, and a delay period, during which the temperature estimation part continues to calculate the estimated temperature after turning off of the starting switch.

2. The shift range switchover control device according to claim 1, further comprising:
   a non-volatile memory, which stores the final temperature,
   wherein the temperature estimation part calculates the restart-time temperature based on the final temperature retrieved from the non-volatile memory and an off period, which is an elapse of time after the system stop time to turning on the starting switch.

3. The shift range switchover control device according to claim 2, wherein:
   the temperature estimation part acquires the off period from a timer, which is provided internally.

4. The shift range switchover control device according to claim 2, wherein:

the temperature estimation part acquires the off period from a timer, which is provided in an engine control part for controlling driving of an engine.

5. The shift range switchover control device according to claim 2, wherein:

the temperature estimation part sets the restart-time temperature to the final temperature when the off period is shorter than a first predetermined check threshold period;

the temperature estimation part sets the restart-time temperature to a temperature, which is determined by negatively correcting the final temperature in accordance with the off period, when the off period is equal to or longer than the first predetermined check threshold period and shorter than a second predetermined check threshold period, which is longer than the first predetermined check threshold period; and the temperature estimation part sets the restart-time temperature to a predetermined initial temperature when the off period is equal to or longer than the second predetermined check threshold period.

6. The shift range switchover control device according to claim 1, wherein:

the temperature estimation part calculates the delay period to increase with an increase of the final temperature.

7. The shift range switchover control device according to claim 6, wherein:

the temperature estimation part calculates the delay period based on a period, which is required for a temperature of the actuator to fall to a predetermined initial temperature.

* * * * *